(No Model.) 3 Sheets—Sheet 1.

F. M. HATCH.
BICYCLE NEWSPAPER RACK.

No. 578,871. Patented Mar. 16, 1897.

WITNESSES:
H. D. Nealy
J. A. Walsh

INVENTOR
Francis M. Hatch,
BY Chester Bradford,
ATTORNEY.

(No Model.)  3 Sheets—Sheet 2.

F. M. HATCH.
BICYCLE NEWSPAPER RACK.

No. 578,871. Patented Mar. 16, 1897.

WITNESSES:
H. D. Nealy.
J. A. Walsh.

INVENTOR
Francis M. Hatch,
BY Chester Bradford,
ATTORNEY.

THE NORRIS PETERS CO., PHOTO-LITHO., WASHINGTON, D. C.

(No Model.) 3 Sheets—Sheet 3.

F. M. HATCH.
BICYCLE NEWSPAPER RACK.

No. 578,871. Patented Mar. 16, 1897.

WITNESSES:

INVENTOR
Francis M. Hatch,
BY
Chester Bradford,
ATTORNEY.

THE NORRIS PETERS CO., PHOTO-LITHO., WASHINGTON, D. C.

UNITED STATES PATENT OFFICE.

FRANCIS M. HATCH, OF SOUTH BEND, INDIANA.

BICYCLE NEWSPAPER-RACK.

SPECIFICATION forming part of Letters Patent No. 578,871, dated March 16, 1897.

Application filed July 3, 1896. Serial No. 598,058. (No model.)

*To all whom it may concern:*

Be it known that I, FRANCIS M. HATCH, a citizen of the United States, residing at South Bend, in the county of St. Joseph and State of Indiana, have invented certain new and useful Improvements in Bicycle Newspaper-Racks, of which the following is a specification.

The object of my said invention is to provide a convenient and commodious receptacle for carrying newspapers on bicycles whereby the carriers are enabled to conveniently carry a large number of papers, and thus rapidly cover an extensive route.

Said invention will be first fully described, and the novel features thereof then pointed out in the claims.

Figure 1:
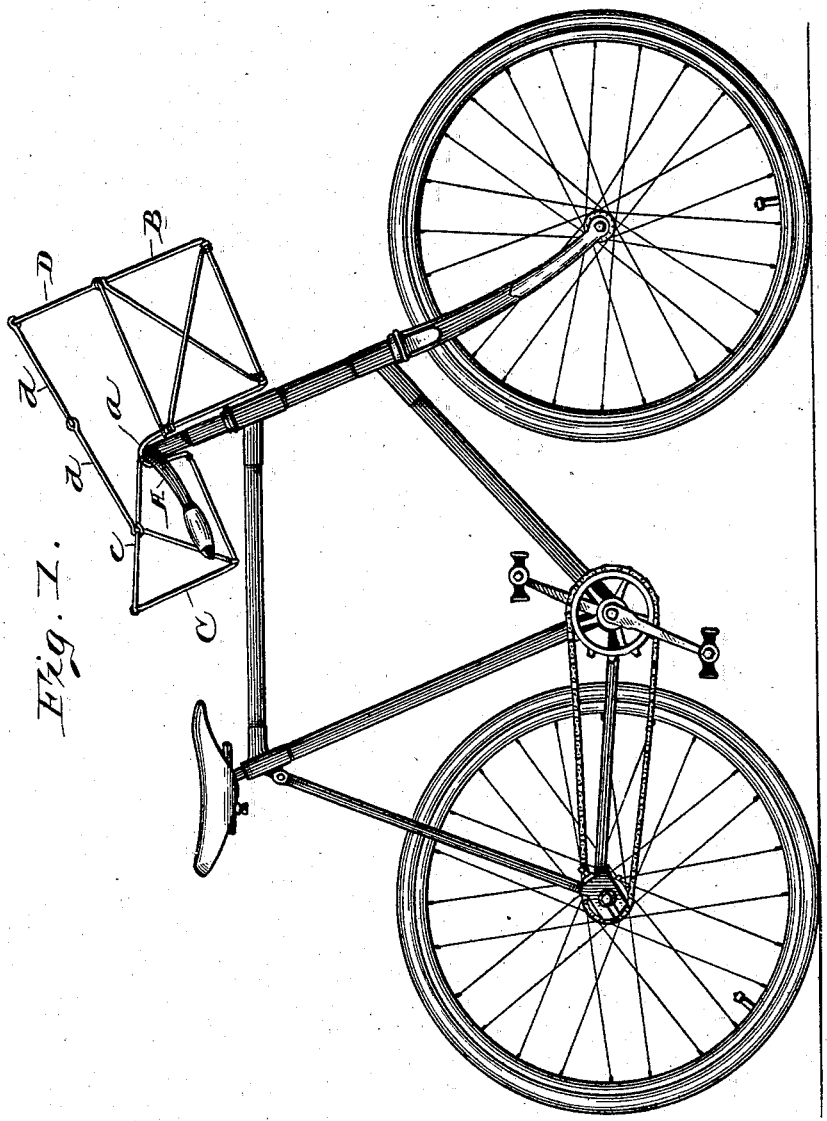
Figure 2:
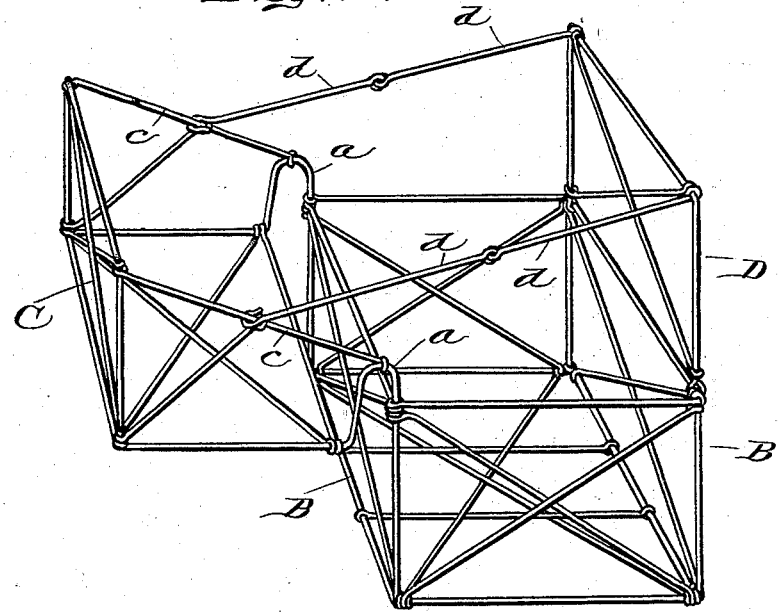
Figure 3:
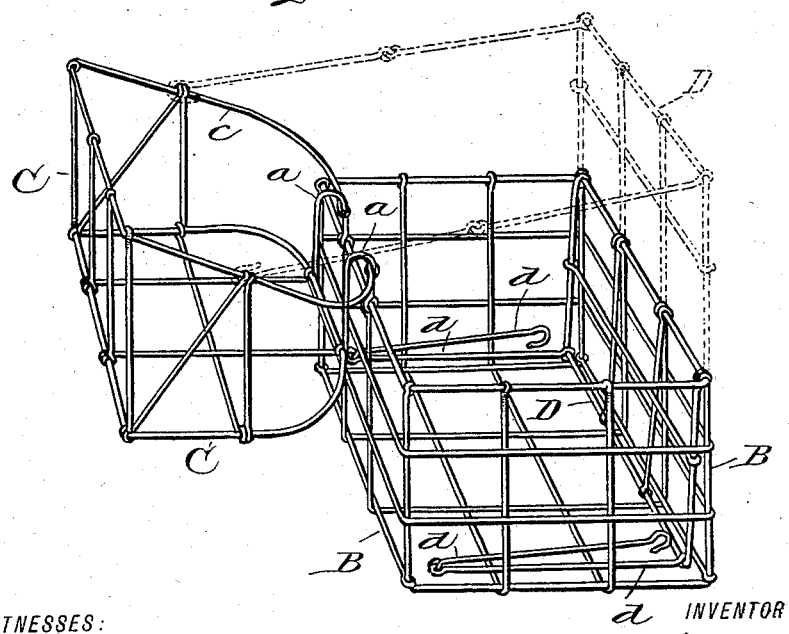
Figure 4:
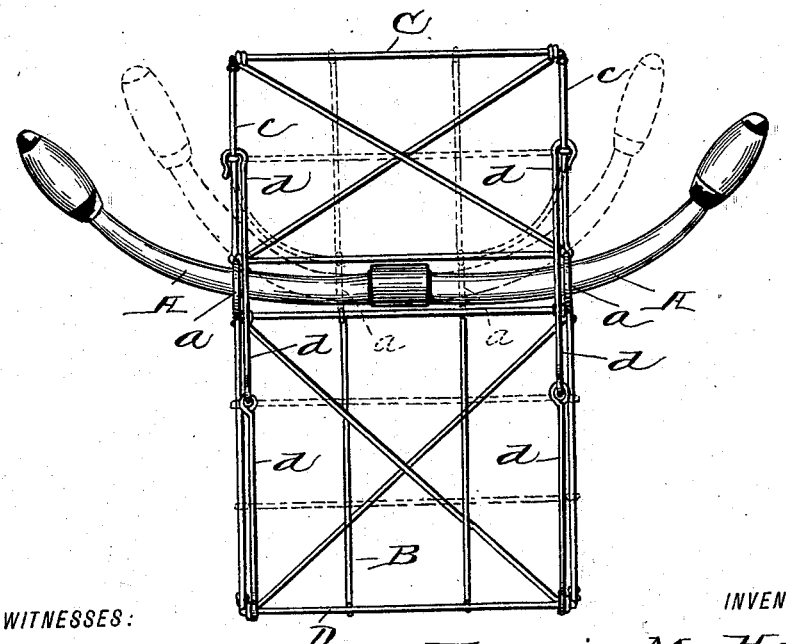

Referring to the accompanying drawings, which are made a part hereof and in which similar letters of reference indicate similar parts, Figure 1 is a side elevation of a bicycle equipped with a newspaper-rack embodying my said invention; Fig. 2, a perspective view of the rack separately, on an enlarged scale; Fig. 3, a similar view, except that the rack is shown as constructed for a bicycle having narrow handle-bars and the extensible portion thereof folded in; Fig. 4, a top or plan view of the newspaper-rack and the handle-bar, the various kinds of handle-bars being indicated by means of dotted lines; and Fig. 5, a perspective view, on a smaller scale, of the rack in position on a bicycle.

The bicycle itself is or may be of any usual or desired construction and is provided with the usual handle-bar A.

The rack is composed of practically three sections B, C, and D and contains loops *a*, which are between the sections B and C and fit over the handle-bar of the bicycle, as shown. The main section of the rack is rectangular in form and is composed of a series of small rods jointed together and is capable of receiving and carrying a considerable number of newspapers. The construction is best illustrated in Figs. 2 and 3, Fig. 2 illustrating the preferred form.

Figure 5:
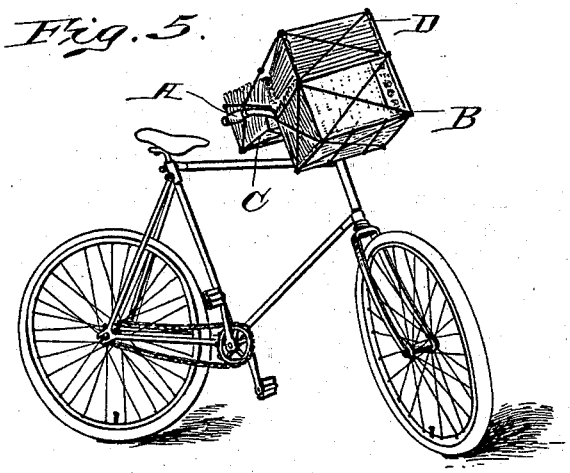

The main section B in use rests in front of the handle-bars, as clearly shown in Figs. 1 and 5.

The second section C is in the rear of the handle-bar, is rectangular at the bottom, but preferably somewhat tapered at the top, having brace-rods *c*, which run from its rear upper edge to the loops *a*. This section also is of considerable capacity and adapted to carry a quantity of newspapers.

The third section is a folding section and consists of a single folding part D, hinged to the front edge of the section B and stayed at its top by rods *d*, which run back and hook onto the side bars *c* of the section C. As shown in Fig. 3, this section can be folded down to within the section B, if desired.

The whole forms a very light, inexpensive, and commodious means for carrying newspapers and enables the carriers to do their work very expeditiously and to do much more of it than by the ordinary means.

Having thus fully described my said invention, what I claim as new, and desire to secure by Letters Patent, is—

1. The combination, with a bicycle, of a newspaper-rack composed of cage-like sections arranged to be mounted upon and carried by the handle-bar of the bicycle, said sections embodying rods or wires entering into the construction of both and having bends therein between the sections adapted to rest upon the handle-bar of the bicycle, the whole being constructed and arranged substantially as shown and described.

2. A newspaper-rack for bicycles composed of three sections, the supporting-point being located between the two lower sections, and the third section being a foldable section located above the first section, substantially as shown and described.

3. The combination, in a newspaper-rack, of the main section B, the second section C, the bends or loops *a* between said two sections adapted to rest on the bicycle handle-bar, said second section having brace-rods *c* which run from its upper edge to the loop *a*, and the folding top section D having the jointed stay-rods *d*, said last-named section being adapted to be folded down to within the first section when required, all substantially as shown and described.

In witness whereof I have hereunto set my hand and seal, at Indianapolis, Indiana, this 30th day of June, A. D. 1896.

FRANCIS M. HATCH. [L. S.]

Witnesses:
 CHESTER BRADFORD,
 JAMES A. WALSH.